United States Patent
Frericks et al.

(10) Patent No.: US 10,671,923 B2
(45) Date of Patent: Jun. 2, 2020

(54) GENETIC METHOD FOR THE TRACKING OF TIME VARYING SIGNALS

(71) Applicant: Gemtrex, Inc., Anaheim Hills, CA (US)

(72) Inventors: Jeffrey Frericks, Anaheim Hills, CA (US); Clifford W. Kelley, Rancho Palos Verdes, CA (US)

(73) Assignee: GEMTREX INC., Anaheim Hills, CA (US)

(*) Notice: Subject to any disclaimer, the term of this patent is extended or adjusted under 35 U.S.C. 154(b) by 813 days.

(21) Appl. No.: 15/106,683

(22) PCT Filed: Dec. 22, 2014

(86) PCT No.: PCT/US2014/072000
§ 371 (c)(1),
(2) Date: Jun. 20, 2016

(87) PCT Pub. No.: WO2015/095894
PCT Pub. Date: Jun. 25, 2015

(65) Prior Publication Data
US 2017/0004400 A1    Jan. 5, 2017

Related U.S. Application Data

(60) Provisional application No. 62/077,742, filed on Nov. 10, 2014, provisional application No. 61/919,463, filed on Dec. 20, 2013.

(51) Int. Cl.
*G06N 3/12*    (2006.01)
*G06N 20/00*   (2019.01)

(52) U.S. Cl.
CPC ............. *G06N 3/126* (2013.01); *G06N 20/00* (2019.01)

(58) Field of Classification Search
CPC .............................. G06N 3/126; G06N 20/00
(Continued)

(56) References Cited

U.S. PATENT DOCUMENTS 6,516,021 B1 *  2/2003  Abbott ................... G01S 19/26
                                                    342/108
7,330,279 B2    2/2008  Vuong et al.
(Continued)

FOREIGN PATENT DOCUMENTS

JP        2002-170097 A     6/2002

OTHER PUBLICATIONS

Chung-Liang, Chang et al., "Application of Innovation-Based Genetic Control Scheme to Signal Acquisition for Global Navigation Satellite Systems" Aug. 18-21, 2009 International Joint Conference ICCAS-SICE, pp. 3569-3574 (Year: 2009).*

(Continued)

*Primary Examiner* — Miranda M Huang
*Assistant Examiner* — Chase P. Hinckley
(74) *Attorney, Agent, or Firm* — K&L Gates LLP

(57) ABSTRACT

A method for the coherent tracking of a time varying signal using evolutionary computing including global and local optimization techniques for the purpose of obtaining better performance under poor signal reception conditions, multipath errors, indoors, and for obtaining more accurate estimates of carrier phase, carrier frequency, and modulation phase at low signal levels without being subject to the traditional phase lock tracking loops (PLL) or delay lock tracking loops (DLL) limitations.

15 Claims, 14 Drawing Sheets

(58) Field of Classification Search
USPC .......................................................... 706/13
See application file for complete search history.

(56) References Cited

U.S. PATENT DOCUMENTS

| | | | | |
|---|---|---|---|---|
| 2002/0021241 | A1* | 2/2002 | Zhodzishky | G01S 19/37 342/357.27 |
| 2003/0018430 | A1* | 1/2003 | Ladetto | G01C 21/16 701/472 |
| 2008/0180321 | A1* | 7/2008 | Wang | G01S 19/235 342/357.62 |
| 2009/0066574 | A1* | 3/2009 | De Lorenzo | G01S 19/21 342/357.59 |
| 2009/0141775 | A1* | 6/2009 | Kober | H04B 1/1027 375/148 |
| 2011/0293042 | A1* | 12/2011 | Rosenhouse | H04L 25/0232 375/316 |
| 2013/0057434 | A1* | 3/2013 | Krasner | G01S 5/0263 342/387 |
| 2013/0265193 | A1* | 10/2013 | Kennedy | G01S 19/46 342/357.29 |
| 2014/0155098 | A1* | 6/2014 | Markham | H04B 1/0064 455/456.3 |
| 2015/0036724 | A1* | 2/2015 | Van Dierendonck | G01S 19/42 375/147 |
| 2015/0234053 | A1* | 8/2015 | Psiaki | G01S 19/215 342/357.51 |

OTHER PUBLICATIONS

Li, Yuanxiang et al., "Analysis of Optimal Trajectory on Evolutionary Algorithm and Some Control Strategies" 2002 IEEE Wuhan University, pp. 558-563 (Year: 2002).*

Vasile, M. et al., "A Dynamical System Perspective on Evolutionary Heuristics Applied to Space Trajectory Optimization Problems" 2009 IEEE Congress on Evolutionary Computation pp. 2340-2347 (Year: 2009).*

Sen, Satyabrata, "Adaptive OFDM Radar for Target Detection and Tracking" Dec. 2010, Doctoral Dissertation, Washington University in St. Louis, pp. i-173. (Year: 2010).*

Roth, Matthias, "Optimal Dynamic Discrimination in the Laboratory" Nov. 2007, Doctoral Dissertation, Princeton University, pp. i-215. (Year: 2007).*

Sayadi et al., "A Hybrid Genetic Algorithm-Assisted Channel Estimation for Downlink MIMO MC-CDMA Communication Systems", Proceedings of the Regional Engineering Postgraduate Conference, Oct. 21, 2009, 9 pages.

Misra et al., "Code and Carrier Tracking Loops for GPS C/A Code", International Journal of Pure and Applied Sciences and Technology, vol. 6, Issue 1, Sep. 30, 2011, pp. 1-20.

Oliveira et al., "Simplified Local Search Multiuser Detection for QPSK S/MIMO MC-CDMA Systems", 2nd International Conference on Signal Processing and Communication Systems, Dec. 15, 2008, ICSPCS, IEEE, 6 pages.

Montaser et al., "Slotted Bow-Tie Antenna Design for RFID Readers using Hybrid Optimization Techniques", 28th National Radio Science Conference (NRSC), Apr. 26, 2011, IEEE, 8 pages.

Zhang et al., "A solution to combinatorial optimization with time-varying parameters by a hybrid genetic algorithm", International Congress Series, vol. 1269, Aug. 31, 2004, pp. 149-152.

Cheng et al., "A tutorial survey of job-shop scheduling problems using genetic algorithms, part II: hybrid genetic search strategies", Computers & Industrial Engineering, vol. 36, 1999, pp. 343-362.

Kelley et al., "Minimizing the cost of availability of coverage from a constellation of satellites: Evaluation of optimization methods", Systems Engineering, vol. 7, No. 2, Feb. 3, 2004, pp. 113-122.

International Search Report and Written Opinion for International Application No. PCT/US2014/072000 dated Oct. 26, 2015.

International Preliminary Report on Patentability for International Application No. PCT/US2014/072000 dated Jun. 21, 2016.

* cited by examiner

GENETIC METHOD FOR THE TRACKING OF TIME VARYING SIGNALS

CROSS REFERENCE TO RELATED APPLICATIONS

The present application is a U.S. national phase application filed under 35 U.S.C. § 371 of International Patent Application No. PCT/US2014/072000, entitled "A GENETIC METHOD FOR THE ACQUISITION AND TRACKING OF TIME VARYING SIGNALS", filed Dec. 22, 2014, which application claims the benefit of U.S. Provisional Patent Application Ser. No. 61/919,463, filed Dec. 20, 2013 and entitled "GENETIC METHOD FOR ACQUISITION AND TRACKING OF TIME VARYING SIGNALS", and U.S. Provisional Patent Application Ser. No. 62/077,742, filed Nov. 10, 2014 and entitled "GENETIC METHOD FOR ACQUISITION AND TRACKING OF TIME VARYING SIGNALS", of which are incorporated herein by reference in their entirety.

BACKGROUND

Since the 1980's when the Global Positioning System ("GPS") constellation of radio navigation satellites was being deployed, Government and industry have been working towards making satellite radio navigation more and more accurate and available. First envisioned as a military utility to be mainly used by aircraft and ground troops, the signal has always been thought of as weak. While strong enough to be used outdoors when there is a clear line of sight to the satellite, users have pushed for the ability to use it where signals have been weakened by going through building walls or trees.

Two areas that present some of the highest challenges to such a system include first, the ability to track indoors in challenging attenuated environments, and secondly, the ability to reduce or eliminate multipath errors; now considered one of the more dominant errors in the system.

GPS utilizes the L-Band portion of the Radio Frequency ("RF") spectrum which inherently does not transmit well through structures, foliage, buildings, and other attenuated environments. This loss of signal can prevent a receiver from obtaining all satellites in view and in many cases cannot receive a solution or may arbitrarily lock onto a false multipath signal. This produces either a very poor solution or no solution at all. Because of poor signal reception, many receivers go into a "code" tracking mode where the "carrier" cannot be tracked and the poorer resolution code loops take over to give a deeper tracking capability. However, code loop tracking with low Signal to Noise Ratio ("SNR") can result in large tracking errors, which result in poor accuracy solutions.

Additionally Phase lock loops, Costas loops, delay lock loops traditionally used for tracking purposes can be fairly unstable and unable to track beyond typically 15 degrees of phase tracking error. Robust solutions that can track over all these conditions have been sought. As a whole, the industry has been researching and developing solutions to address these issues for years but have been unable to achieve a high accuracy and robust solution for a practical implementation and cost.

A few of the primary methods that have been developed to address some of these issues are a) enhanced phase lock loop, Costas loop and delay lock loop variants; b) aided solutions using fusion from optical, network aiding, integration of Wi-Fi, cellular and other RF signals of opportunity, c) long coherent duration integration using high quality inertials and high quality clocks, and d) Real time kinematic techniques and differential GPS to track the carrier phase cycles for a high precision application; e) long duration non-coherent tracking methods.

All of these methods and others have generally fallen short in that they only address a portion of the problem set and in many cases are not practical implementation for the average mobile navigation user. Solutions using enhanced phase look loops, current attempts in developing fusion solutions, and long coherent track attempts employing INS and/or high quality clocks all have issues involving complexity, cost and integration challenges. While non-coherent track can extend low signal code tracking, it also has correlation integration time limitations and measurement accuracy limitations compared to the low level coherent signal tracking achievable by the current invention. In addition non-coherent methods in many cases do not address multi-path errors. Although the background problem is stated in terms of a GPS system, the techniques described herein can be applied to any time varying signal processing analysis, including but not limited to radio signals, acoustic signals, imaging signals, biological signals, RADAR signals, and communication signals.

SUMMARY

A method and apparatus wherein concatenated Genetic (Global) and Local Optimization algorithms are used as a process for acquiring and/or tracking time varying signals. The inventive technique includes a unique formulation for processing spread spectrum signals that consists of using an enhanced genetic algorithm especially formulated to generate multi-dimensional reference vectors for signal correlation processing and signal tracking. The technique consists of reading in samples of down converted data from a signal source, optionally reading in a current set of data bits from a local network and using a genetic algorithm which creates and uses multi-dimensional state vectors to correlate with the incoming signal. The genetic process consists of forming an initial multi-dimensional state vector population; performing a unique non-binary reproduction operation and mutation process on the vector population to generate successive vector state populations; performing local optimization on the vector population each generation cycle to optimize on selected state variables; and providing a process for removing cycle slips for tracking operations after the genetic algorithm has completed.

In various embodiments, the present disclosure relates generally to signal processing and more particularly to a system and method for acquiring and/or tracking time varying signals such as spread spectrum signals that use multiple access and signal spreading techniques. Common spread spectrum techniques include code division multiple access ("CDMA"), frequency division multiple access ("FDMA") or frequency hop ("FH"), time division multiple access ("TDMA") and combinations of these methods.

The disclosure also relates to processing and tracking of other time varying signals such as biological signals. An example of such would be the determining and tracking of pulse rate data.

Acquisition and tracking of spread spectrum signals require the correlation of the received composite signal with a reference signal generated by the receiver. As an example, for the case of GPS signal acquisition and coherent or non-coherent tracking, a reference signal for each satellite used for positioning and navigation must be initially synchronized to the incoming signal and the reference signal maintained during the signal tracking process. Acquisition is the process whereby the receiver reference signals are aligned in carrier frequency, code phase and carrier phase with received signals. Traditionally, the acquisition process has been implemented using various systematic finite frequency and/or time domain search techniques either employing time correlation or fast Fourier transforms over a constrained search space. Once the incoming signals are detected using one of these traditional two-dimensional time/frequency search techniques, a tracking function maintains signal synchronization.

Tracking is accomplished by controlling the reference signals generated by the receiver so that they remain locked to the incoming signal. Traditionally phase lock tracking loop techniques are used to track the relative dynamics between the user receiver and satellites to maintain this lock. Typically two individual code and carrier phase lock loops are used to track the relative line-of-sight ("LOS") dynamics between the user receiver and each satellite. In some configurations, the carrier loop may aid the code loop. Typical code and carrier tracking loops are characterized by the type of integration used during the correlation process (i.e. coherent or non-coherent integration); the exact form of the error discriminator used to measure the difference between the incoming signal and the reference signal; and different loop filter types, orders and bandwidths. Alternatively, tracking may traditionally be accomplished using different forms of tight or ultra-tight tracking loops that might employ Kaman filters.

The present disclosures describes methods and apparatus where concatenated Genetic Global and Local Optimization algorithms are used as a process for acquiring and/or tracking time varying signals. The present disclosure describes a unique formulation for processing spread spectrum signals that comprises using an enhanced genetic algorithm especially formulated to generate multi-dimensional reference vectors for signal correlation processing and signal tracking. The technique for processing spread spectrum comprises reading in samples of down converted data from a signal source, optionally reading in a current set of data bits from a local network and using a genetic algorithm which creates and uses multi-dimensional state vectors to correlate with the incoming signal. The genetic process consists of forming an initial multi-dimensional state vector population; performing a unique non-binary reproduction operation and mutation process on the vector population to generate successive vector state populations; performing local optimization on the vector population each generation cycle to optimize on selected state variables; and providing a process for removing cycle slips for tracking operations after the genetic algorithm has completed.

In one embodiment, the present disclosure provides a new and improved method to accomplish the function provided by traditional code and carrier signal tracking methods, eliminating the requirement for all forms of traditional tracking loop implementations and combining the all tracking operations in one process. In addition this method may be used in the acquisition process. This technique comprises:

1. Based on general concepts in evolutionary computing inspired by population genetics using multi-dimensional reference signal vectors; and 2. The genetic tracking process is combined with a local optimization and cycle slip correction technique in a concatenated and iterative process to maintain signal tracking.

The proposed technique incorporates principles utilizing genetic algorithms that are uniquely and specifically adapted for any form of spread spectrum code and/or carrier signal processing and tracking or any form of a time varying signal. In performing the tracking operation, this newly developed tracking technique mimics the process of natural evolution in the selection of the code and carrier phase used in the generation of reference signals used for signal correlations. Tracking techniques based on evolutionary computations offer benefits of flexibility and adaptability providing operating advantages in challenging environments of low signal levels and multipath environments. These new principles may be applied for tracking spread spectrum signals of which GPS is one application. Furthermore, this new method can also be used to accomplish spread spectrum signal acquisition using variations of the same concatenated evolutionary computing technique combined with local optimization.

DETAILED DESCRIPTION

Figure 1:
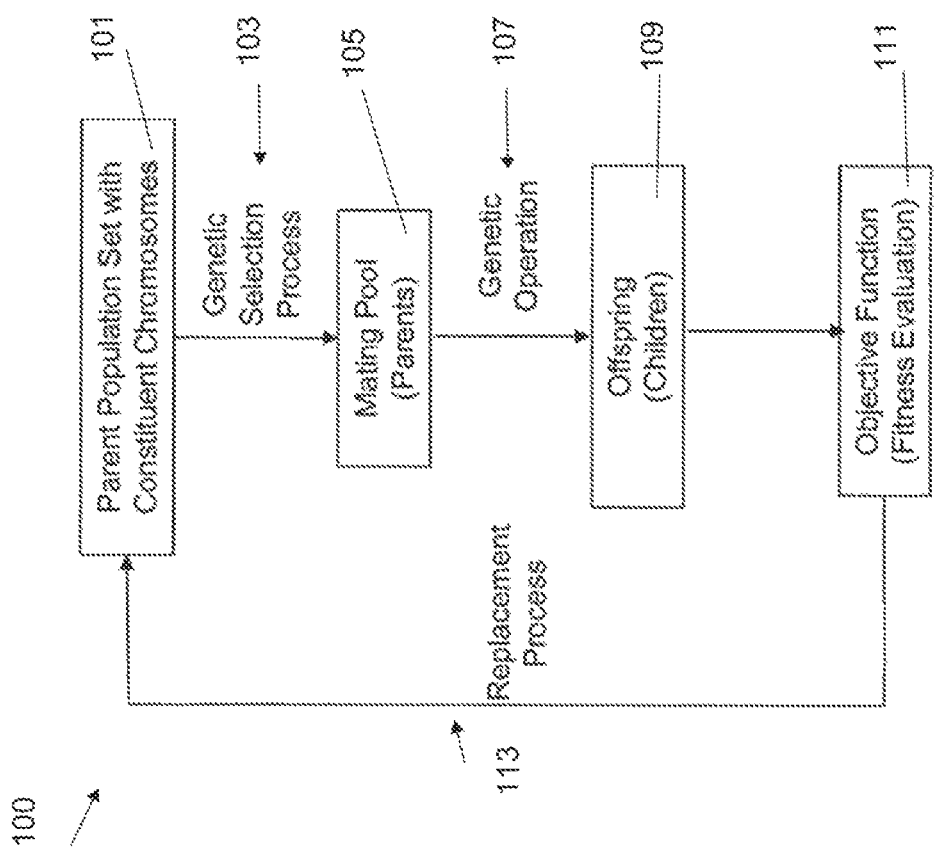
FIG. 1 is a general block diagram illustrative of the generalized genetic cycle used in the signal tracking process according to one embodiment of the present disclosure.

A generalized genetic algorithm cycle 100 may be partitioned into distinct parts as shown in FIG. 1. Parents 101 characterized by their chromosomes, are selected from a larger population to generate offspring. Parent selection is done by a chosen genetic selection process in step 103. The mating parent pool 105 produces offspring 107 via a selected genetic operation in step 109. Offspring from these selections are evaluated and ranked by a defined genetic evaluation operation or objection function 111. The chromosomes in the existing population are then replaced by those of their offspring, based on a chosen replacement strategy in step 113. This genetic cycle may be repeated until a desired termination criterion is reached. In this manner, the best chromosome in the final population becomes a highly evolved solution to the problem.

In the application of these general genetic principles to the specific problem of time varying signal acquisition and/or tracking, the receiver reference signal's code phase and carrier phase are selected and optimized by a concatenated genetic processing and local optimization algorithm. In one embodiment, the initial "parent" population is comprised of a state vector population whose individual vector components correspond by similarity to a group of chromosomes within each state vector. State vector(s), can be processed by the genetic algorithm and selected as a solution to an instantaneous tracking problem. The fitness values of all state vectors (similar to "parents" from FIG. 1) and individual components of the state vector (similar to "chromosomes" from FIG. 1) are evaluated by calculating an objective function. Additionally, the state vector population is evaluated by correlating the received signal with each reference vector state and ranking the magnitude of the results. Accordingly, the reference signal correlation function may be used as the objective function. Therefore, the instantaneous code phase and carrier phase of the reference signal may be optimized by the uniquely defined genetic algorithm. In addition, a local optimization process and cycle slip correction process may enhance the output of the genetic process. Repetition by iteration of the concatenated genetic and local optimization cycle provides a continuous received signal tracking capability.

In an embodiment, a combined global optimization and local optimization operation is performed whereby first, a global optimization solution using a genetic algorithm is used to maximize the fitness criteria, which may be referred to as correlation, utilizing a general "parent" population composed of sets of multi-segmented reference vectors. Second, a local optimization is performed on shorted and ranked wining reference vectors to creation new members to replace the lowest performance population members in the next generation reference vector set. Third, discontinuities are detected and corrected and the winning reference vector states are propagated forward in time for use during the next input signal sample processing.

Figure 2:
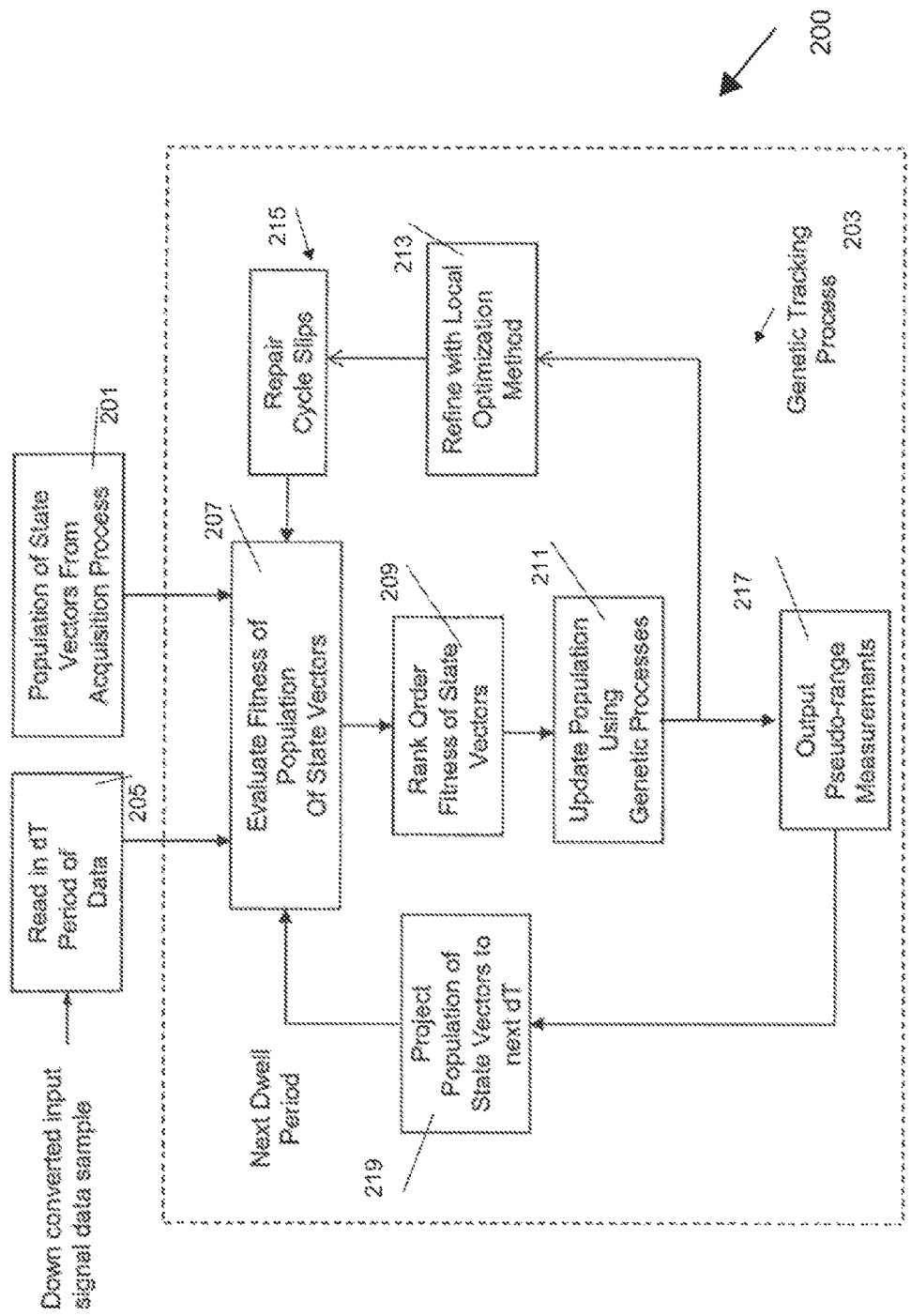
FIG. 2 is a signal processing flow chart for the genetic carrier phase & code phase signal tracking process according to one embodiment of the present disclosure.

An embodiment of a genetic signal tracking process 200, which may be used in a global optimization process, is shown in FIG. 2. During an initial iteration of the genetic tracking process, an array of acquisition state vectors are obtained from an acquisition process in step 201 and input to a concatenated genetic tracking algorithm 203. The dT period of down converted input signal data is read in step 205 and the down converted input signal data is also input to the concatenated genetic tracking algorithm 203. The fitness of each multi-dimensional state vector is evaluated in step 207 and ranked in step 209 with respect to a correlation value associated with the state vector and an input data signal sample. In one embodiment, the objective function employed in genetic operations as the fitness criteria is the correlation function. The state vector population is then updated using the genetic process in step 211. The resulting state vectors are refined with a local optimization algorithm in step 213 and the surviving state vectors are processed by a cycle slip detection and repair algorithm in step 215. Steps 205-215 are repeated for a selected number of generations after which pseudo-range and range rate components in the highest ranking state vector are used as the tracking process output in step 217. All processed state vectors are propagated to the next input sample time interval in step 219. These propagated state vectors become the initial population of state vectors used in processing the next coherent (1/T) ms input data sample.

Figure 3:
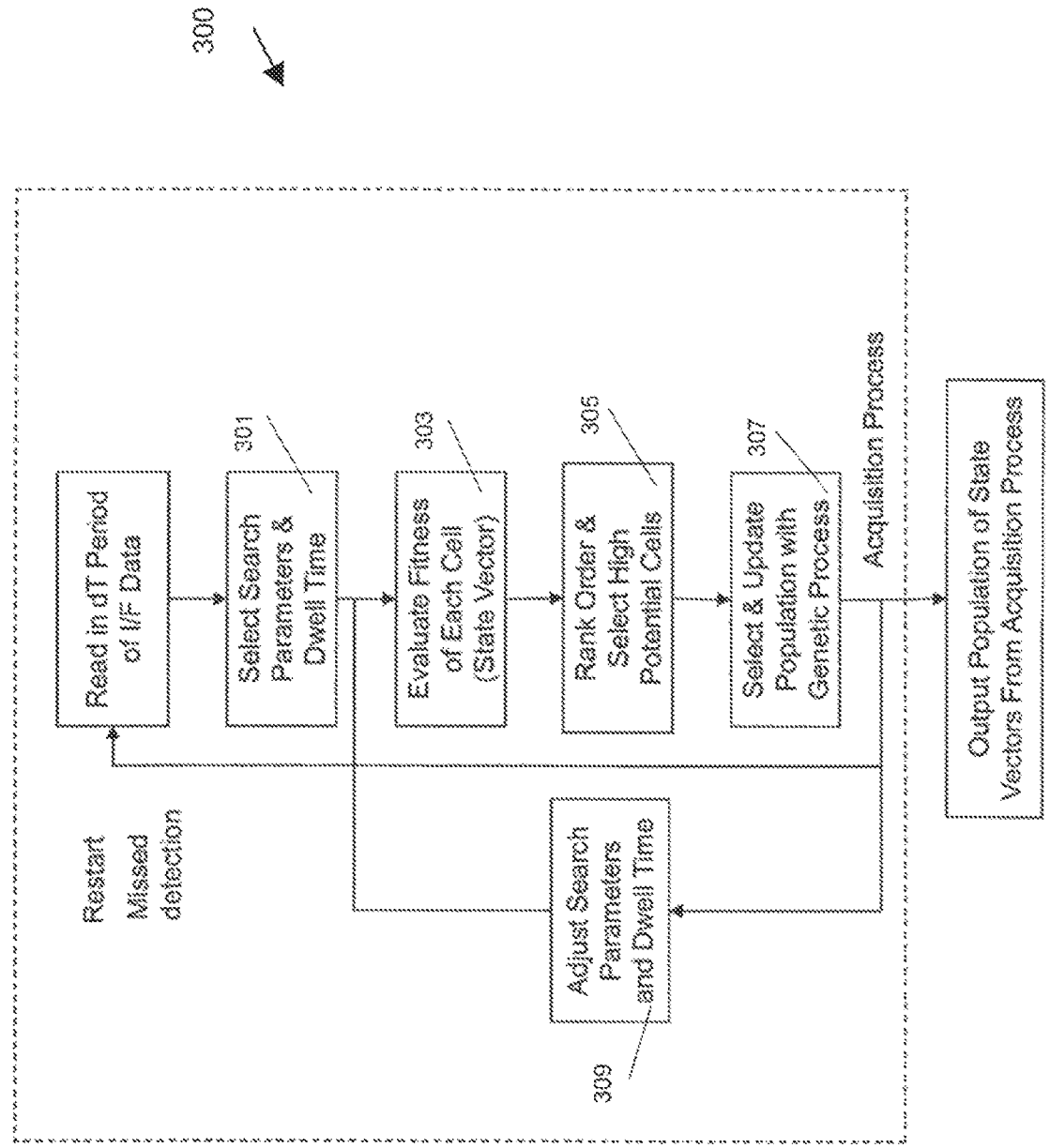
FIG. 3 is a signal processing flow chart for genetic acquisition processing according to one embodiment of the present disclosure.

According to an embodiment, a genetic tracking algorithm may be composed of: 1) establishing and maintaining a non-binary reference state vector population; 2) performing a reproduction operation; 3) a mutation operation algorithm; 4) a local optimization algorithm on the reference vectors; 5) a cycle slip correction procedure; and 6) performing reference state vector propagation for the next iterative cycle. All processes may utilize expanded sets of independent components within vector state population members. For instance, in an embodiment, each vector state may be composed of non-binary signal parameters components, such as, for example, velocity, acceleration, code offset, carrier offset, data bits and data bit time offset to optimize input signal match performance and to improve the length of coherent integration time of the genetic acquisition algorithm as shown in FIG. 3.

In addition, in one embodiment, a local optimization method may be used to enhance the maximal magnitude phase trajectory for each of the multiple time segments represented by the reference state vectors. As noted, each of these optimized vectors has independent carrier/code frequencies and rates which aid in resolving clock and dynamic instabilities. In addition, carrier cycle slips are detected and resolved as a part of the optimization process.

Additionally, genetic concepts may be employed in a distinctive way to allow multi-frequency, multi-segments optimized code sections to be used to improve the length of coherent integration time used in tracking spread spectrum signals by combining both global and local optimization operations as part of a genetic operation.

Further, this same general genetic signal processing concept can be applied to the task of spread spectrum signal acquisition to generate the initial population of state vectors used in the tracking process. As shown in FIG. 3, which is an expansion of step 201 from FIG. 2, in which an array of acquisition state vectors are obtained from an acquisition process, a genetic acquisition algorithm 300 hypothesizes a set of state vectors in step 301. These state vectors are evaluated by correlation fitness criteria in step 303. The state vectors are then ranked in step 305 and updated by a genetic signal process in step 307. The genetic process is iterated by adjusting the search parameters used in the state vectors and the dwell time in step 309.

The genetic acquisition process 300 shown in FIG. 3 may take on the general form of both a variable or multi-dwell acquisition technique, in which the decision threshold is changed during successive cycles in the genetic process, and a semi-maximal likelihood detection process. Accordingly, the genetic acquisition process 300 can perform a selection process over a surviving vector population. Starting with a selected trial probability of false alarm, each succeeding acquisition vector population has a decreased probability of false alarm. For each generation the integration time may be increased and the mutation process consists of the insertion of frequency bins on either side of the point space halfway between the previous generation frequencies interval. Since a population of $N_{pop}$ vectors are passed to the tracking process, the probability of false alarm of each individual trial hypothesis need not be as high as the traditional single point time/frequency acquisition solution. Hence, an improvement in relative acquisition time to track transition may also be expected.

Figure 4:
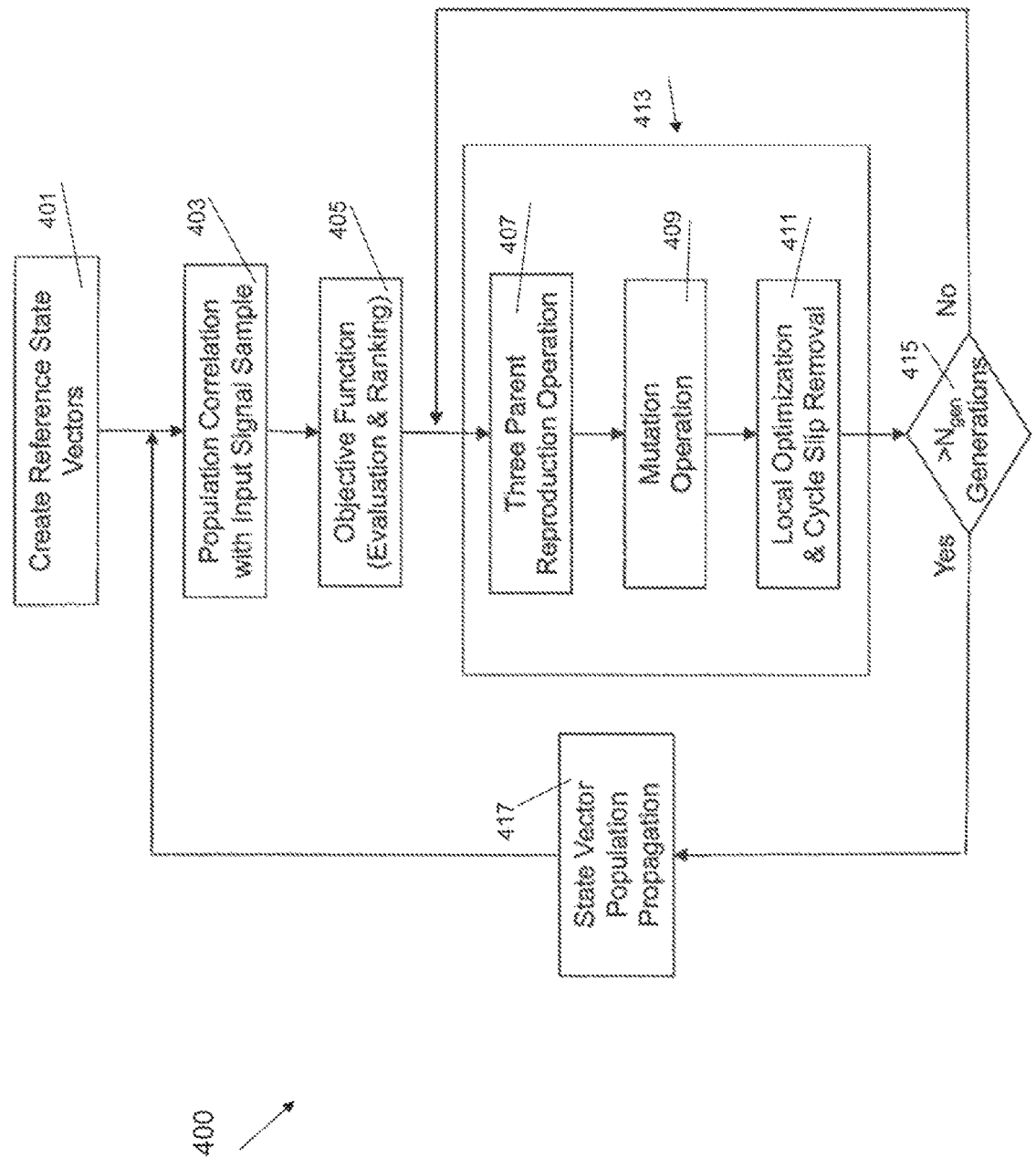
FIG. 4 is a flow diagram showing details of genetic processing for code and carrier phase signal tracking according to one embodiment of the present disclosure.
Figure 5:
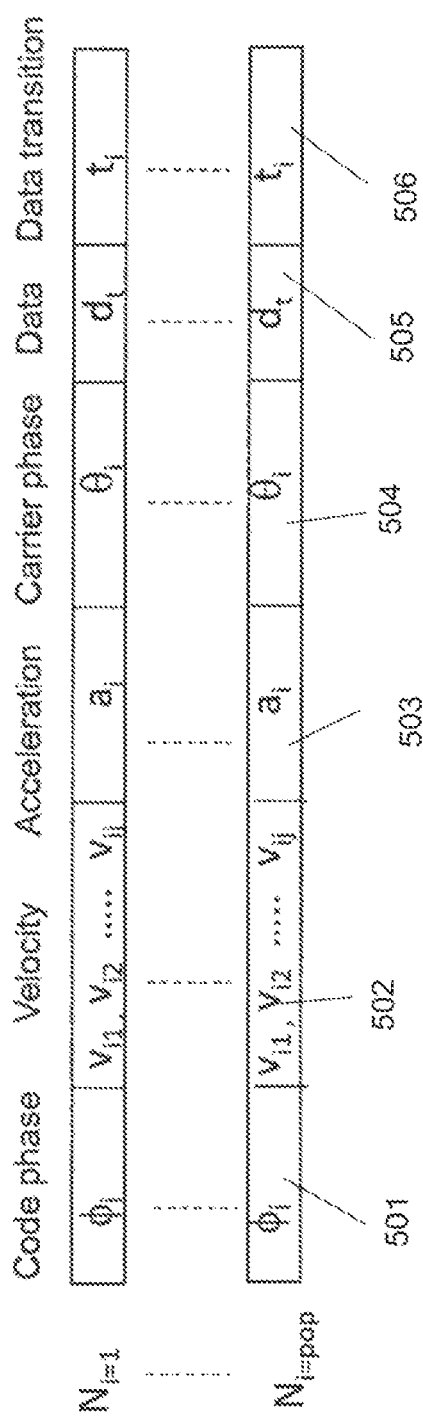
FIG. 5 is the structure of the state vector population according to one embodiment of the present disclosure.

FIG. 4, which is an expansion of the Genetic Tracking Process 203 shown and described with reference to FIG. 3, constitutes a general functional block diagram of a method 400 for tracking the code phase and carrier phase of a spread spectrum signal in accordance with embodiments of the present disclosure. The first step in the concatenated genetic and local optimization signal tracking process 400 is to establish an initial population consisting of $N_{pop}$ reference states and is performed by the create vector state population task in step 401. The initial reference states may be generated from code and carrier phase and carrier rate information obtained from a traditional acquisition process or are a set of state vectors which have been optimized by a genetic acquisition process. Each reference state is represented by an M-ary vector having independent quantized estimates of j different signal component characteristics. As an example, referring to FIG. 5, which is an illustration of a vector state population, an M=6 state spread spectrum reference vector $X_{ij}$ (j=1 . . . 6) used for GPS signal processing could have the following j components:

501—Code phase: $\phi_i$,
502—Line-of-sight velocity: $v_i$,
503—Line-of-sight acceleration: $a_i$
504—Carrier phase: $\theta_i$
505—Data bit ($d_i$)
506—Data transition point: $t_i$ Each of the j unique vector components in the state vector has unique non-binary values of i. As an example, for GPS 100 ms data and data transitions: i=k mod 20 ms. (0≤k≤100) and for carrier phase i=X*½$^n$ of a carrier cycle. In addition the velocity component $V_i$ is itself a multi-dimensional vector having ij components to reduce user clock stability impacts:

$V_i=(v_{i1},v_{i2}, \ldots v_{ij})$ and $j+1=(j+\Delta v)$ and

0≤i≤$N_{pop}$ (population size)
Thus the initial reference vector may be in the form of:

$R_0=[\phi_i,\theta_{i1},(v_{i1},v_{i2}, \ldots v_{ij}),a_i,d_i,dt_k]$

From this initial vector, the initial reference vector population ($N_{pop\ (0)}$) at the beginning of the genetic tracking process may be generated.

Figure 6:
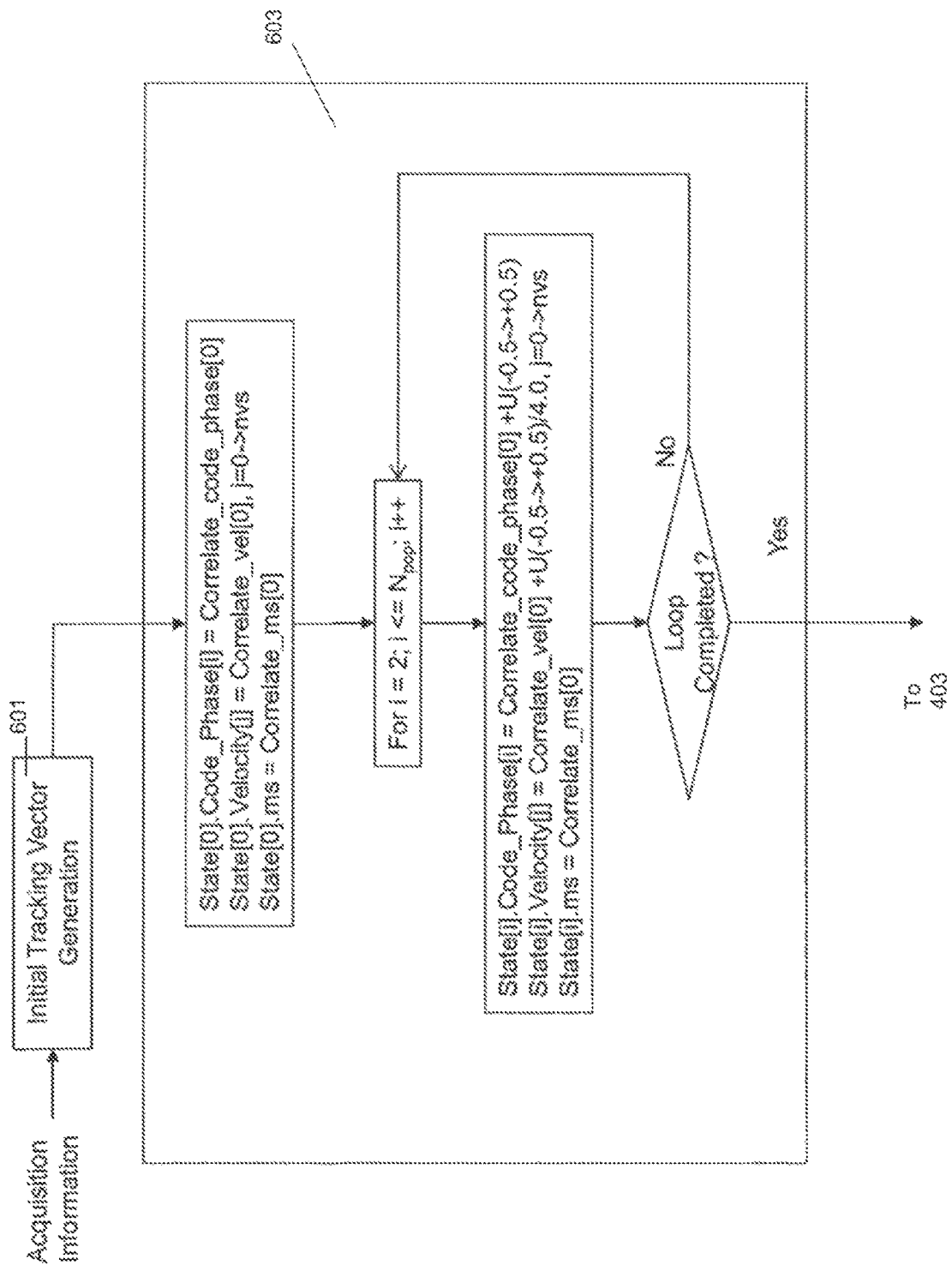
FIG. 6 is a flow diagram illustrating the method of reference state vector population creation as depicted in FIG. 4 according to one embodiment of the present disclosure.

Additionally, FIG. 6 is a flow diagram illustrating reference state vector creation of a three state reference vector population according to one embodiment of step 401 in FIG. 4. As shown in FIG. 6, the code state, velocity, and data transition point from the acquisition process are used as inputs in step 601 to form the initial state vector as the initial vector in the process 603. The vector state population of $N_{pop}$ members is created by using a uniform distribution about the initial code and velocity components to generate addition state vectors as illustrated and described:

State[0].Code_Phase[i]=Correlate_code_phase[0]

State[0].Velocity[j]=Correlate_vel[0], j=0→nvs

State[0].ms=Correlate_ms[0]

State[i].Code_Phase[i]=Correlate_code_phase[0]+U(−0.5→+0.5)

State[i].Velocity[j]=Correlate_vel[0]+U(−0.5→+0.5)/4.0, j=0→nvs

State[i].ms=Correlate_ms[0]

An additional embodiment of this process include one in which an M-component vector of a $2^M$ unknown data sequence is used as a component of the reference vector state. In this case the genetic algorithm may aid the data demodulation process as the received data bit sequence also becomes a component of the genetic optimization process.

Referring back to FIG. 4, the process 400 generates a population of $N_{pop}$ composite reference signal samples, each of which corresponds to a reference vector state, in step 401. Further, the process 400 correlates each the reference signals, represented by the state vectors, with an Nms sample of the received composite spread spectrum input signal in step 403. The resultant is a correlation value that is associated with each member of the reference vector state population. The fitness of each reference vector is assessed using the magnitude of its correlation value as an objective function for genetic evaluation in step 405. Thus the fitness of each reference state vector is determined by the vector components, similar to the "chromosomes", within each reference state vector. These parent reference vectors are then sorted and ranked by the magnitude of their correlation with the input composite signal sample. According to one embodiment, the first stage of the genetic processing algorithm for the t-th input time sample is complete.

Again with reference to FIG. 4, a unique concatenated three stage inter-cycle operation may be employed to obtain the vector set used for the next generation of $N_{pop}$ reference state vectors during signal input time sample t+1 processing. The iterative process 413 consists of repeated passes through a three parent reproduction operation in step 407, a population mutation operation in step 409, and a local optimization process and cycle slip removal process in step 411. The reproduction and mutation processes each generate a new population of $N_{pop/2}$ candidate state vectors "children" which are processed by a local optimization process as shown in step 411. The new reference vector states are then correlated with the input signal sample and the resultant correlation values associated with these candidate reference state vectors are sorted and ranked for the next iteration. This iterative process 413 is repeated until population differences between the best state vectors are not improved or it is limited by the N-th. generation 415. In one embodiment, the N-th generation may typically be the $10^{th}$.

At the end of the iterative process 413, the resultant highest ranked optimized multi-frequency, multi-code segment reference vectors are propagated forward in time in step 417. In one embodiment, reference vector state propagation is performed by adjusting the code phase, carrier phase and data transition point by an amount equal to the carrier phase rate of that reference vector times the iteration interval. The propagated reference vectors may then be used to replace the previous reference state vectors and the repopulated reference vector set may be used with the next input signal data sample during the next cycle of a genetic tracking processing algorithm.

Figure 7:
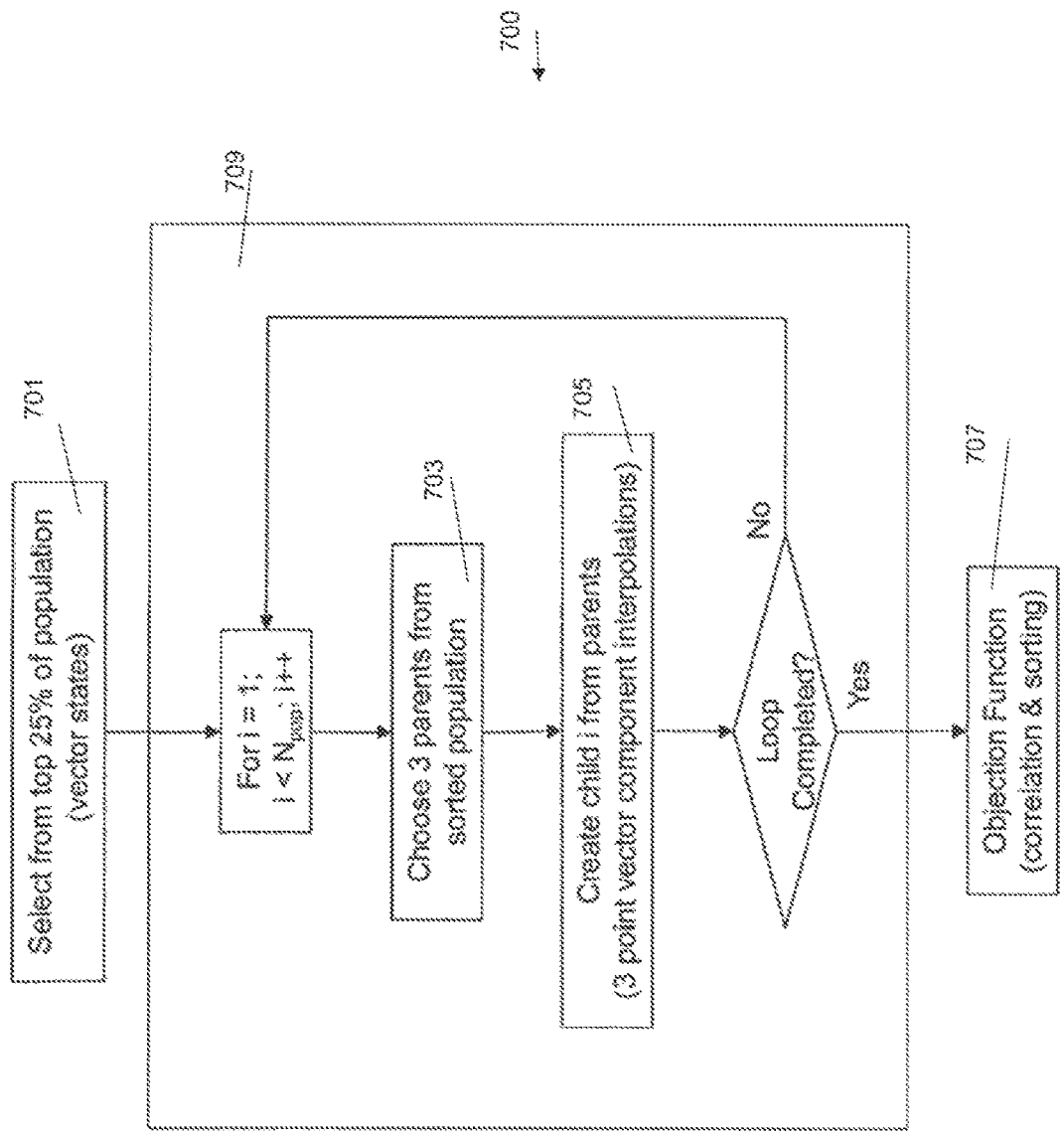
FIG. 7 is a flow diagram illustrating the reproduction operation as depicted in FIG. 4 according to one embodiment of the present disclosure.

FIG. 7 is a flow diagram that expands on FIG. 4 and illustrates an embodiment of a reproduction operation 700. The process 700 uses the top 25 percent by rank of the reference vector population as potential parents to generate $N_{pop/2}$ children as candidates for the next generation. Three M-ary reference state vector parents are randomly selected from the top 25% of the present population, ranked by correlation value in step 701 and they are used to create M-ary child candidate reference state vectors in step 703. Each new state m is formed by a three point interpolation of each individual i component in the parent state vectors in step 705. The parent interpolation process is repeated to generate the new candidate $N_{pop/2}$ reference vector state population in step 707. The resultant vector states are ranked using the correlation function as the genetic objective function in step 709. Thus the fitness of each reference state vector is determined by the vector components, similar to "chromosomes", within each "child" reference state vector. This portion of the genetic tracking algorithm provides a candidate population of $N_{pop/2}$ states for the next genetic algorithm iteration.

Figure 8:
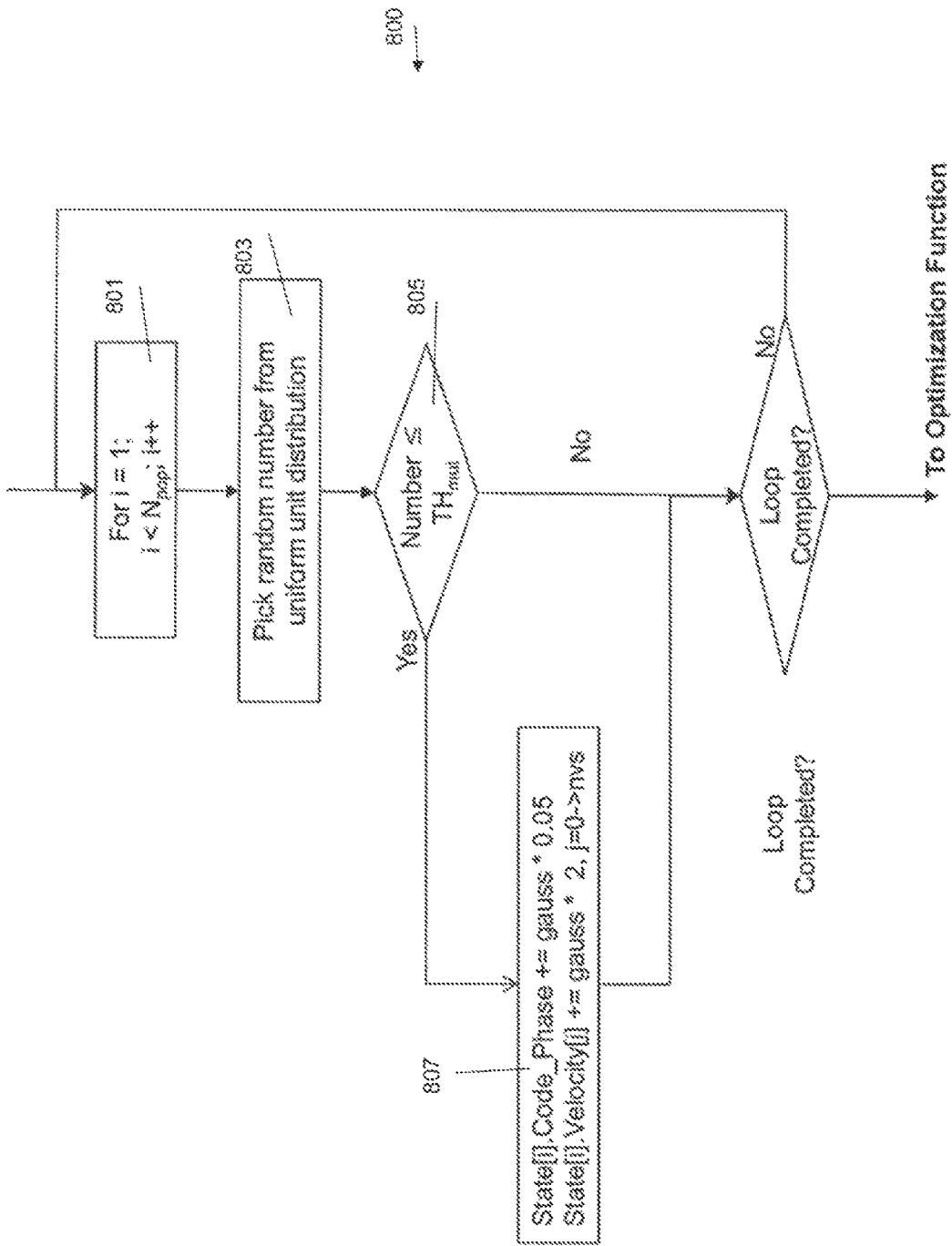
FIG. 8 is a flow diagram showing the mutation operation depicted in FIG. 4 according to one embodiment of the present disclosure.

The third component of the genetic tracking algorithm, shown in the flow diagram of FIG. 8, implements a mutation operation 800. This process is used to determine a candidate selection of the remaining $N_{pop/2}$ reference state vectors for the next iteration of the reproduction operation and evaluation operation. The mutation process either mutates or changes the constituent reference vector components (the "chromosomes") or does not mutate the reference state vectors. Reference state vectors in the bottom 50% by rank of the parent state vectors are subject to these operations.

The number of state vectors mutated and not mutated for each pass is a function of a selected threshold and a generated random number from a selected distribution. As shown in the embodiment of FIG. 8, which is an expansion of the mutation operation performed in step 409, during each pass i of the mutation operation 800 a counter is incremented in step 801 and a random number is selected from a unit sigma uniform distribution in step 803. This number is compared to a threshold $TH_{mut}$ to control the number of total mutations performed on the bottom half of the parent reference state vectors. If a reference state vector is mutated, the constituent components within the state vector are mutated. As illustrative for code phase and velocity vector components, the mutations take the form of:

Code phase $i$=mod [code phase($i$−1)+Gauss*5.0, 1023]

Velocity $i$=Velocity($i$−1)+Gauss*100*(1/gen)

The statistical distribution characteristics of these variables may also be similar to the distributions characteristics use for generating the initial state vector populations.

Figure 9:
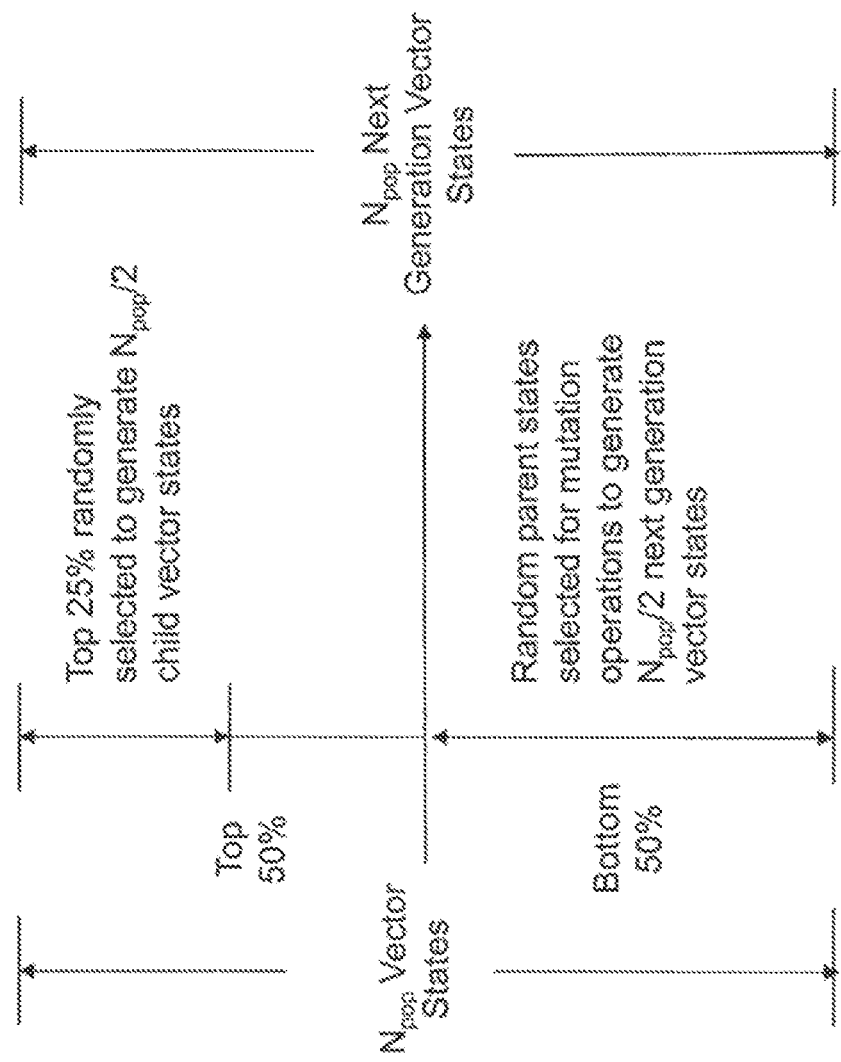
FIG. 9 the current vectors states processed to generate the next generation vector states according to one embodiment of the present disclosure.

If one or more of the reference state vector is not mutated, it remains unchanged during that particular iteration. At the completion of the mutation operation the resultant $N_{pop/2}$ reference state vectors consists of a mixture of mutated and non-mutated patent reference state vectors. As shown in FIG. 9, which is process that provides next generation reference state vectors to the optimization process and is an expansion of the application in step 405 of the objective function as shown in FIG. 4, the $N_{pop/2}$ reference vectors from the mutation process along with the $N_{pop/2}$ reference vectors from the reproduction operation are processed by the local optimization process.

Figure 10:
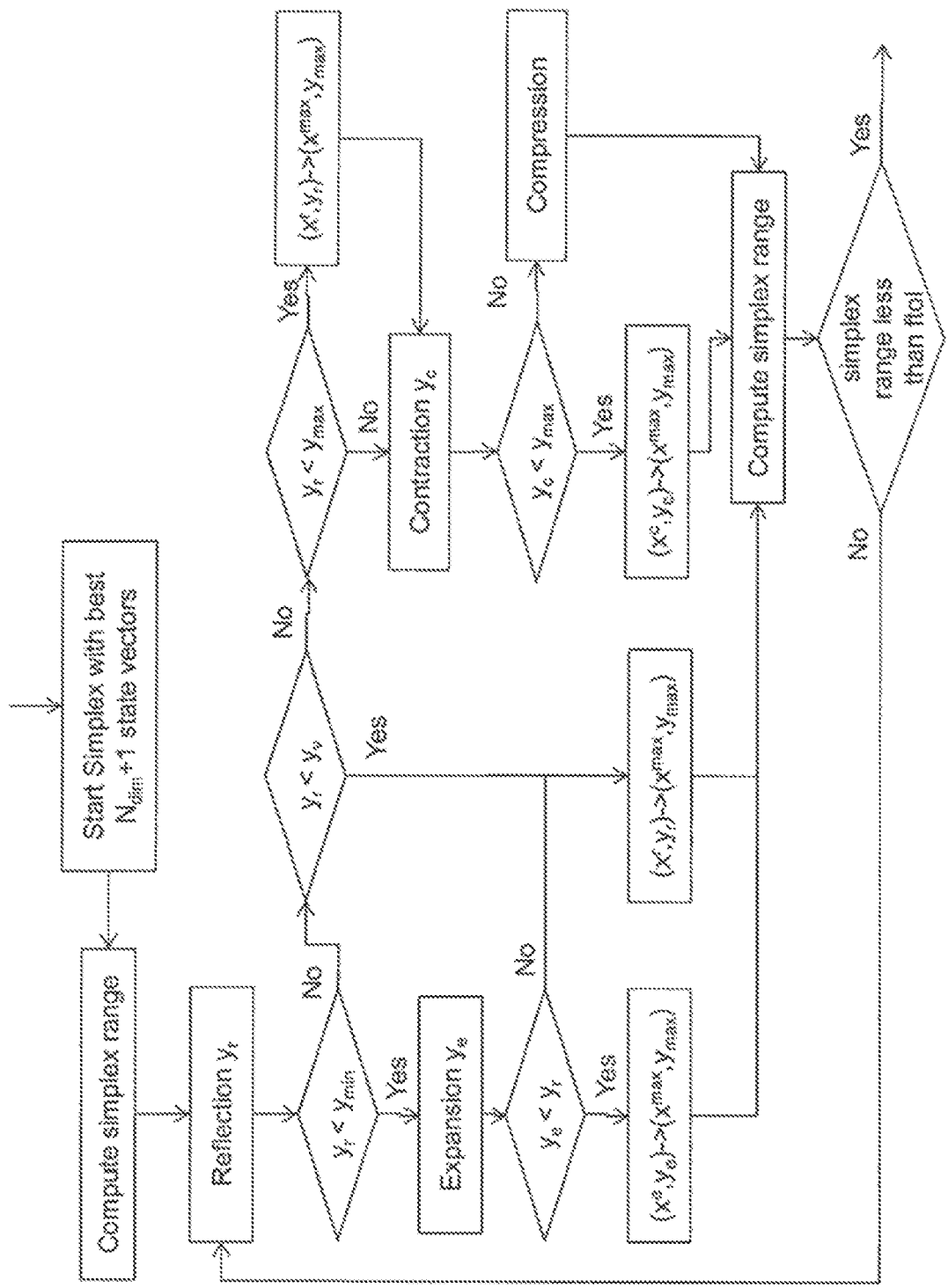
FIG. 10 is a flow diagram showing the local optimization operation depicted in FIG. 2 according to one embodiment of the present disclosure.
Figure 11:
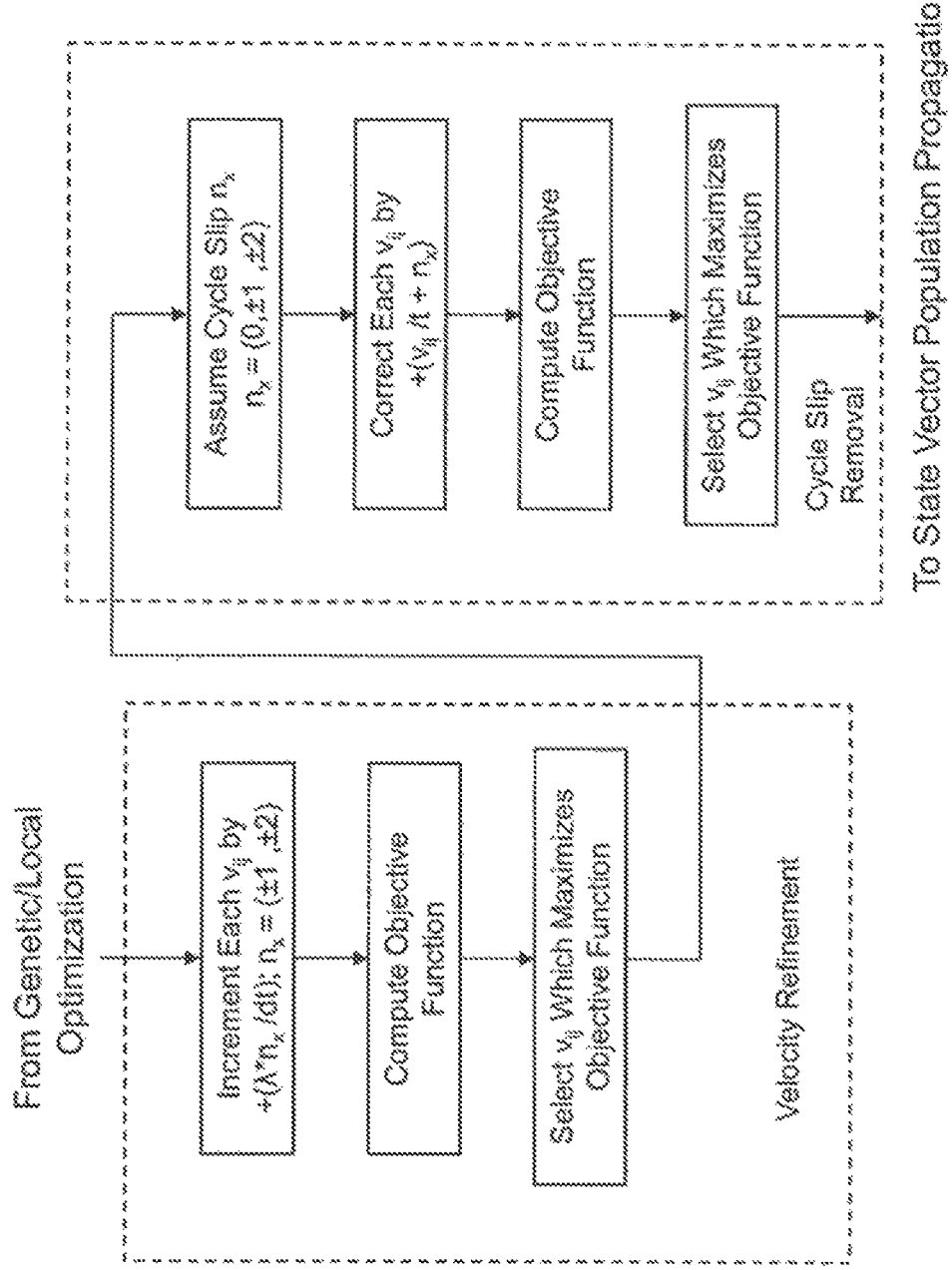
FIG. 11 is a flow diagram showing the cycle slip detection operation depicted in FIG. 2 according to one embodiment of the present disclosure.

FIGS. 10 and 11 provide an expansion of the Local Optimization and Cycle Slip Removal of step 411 shown in FIG. 4. FIG. 10 is a flow diagram showing one type of the local optimization process; a Downhill Simplex process. The optimization process increments the signal components within each signal reference vector to optimize the objective function. Each component within the state vector, with the exception of the bit transition time, is incremented and decremented about it current state value to optimize the objection function. The algorithm used for this example is based upon the Nelder-Mead method or downhill simplex method of nonlinear optimization. This procedure generates a new component in a state vector by extrapolating the behavior of the objective function measured at each test point arranged as a simplex. In summary, the worst point in the simplex is replaced with a point reflected through the centroid of the remaining N points of the simplex. If this point is better than the best current point, then an expansion of the point is attempted. If the new point is not better than the previous value than a contraction of the simplex is attempted towards a better point.

The major steps involved in the Nelder-Mead process are as follows: 1) Ordering—of the magnitude of the objection function with respect to the vector component variable under test; 2) Centroid—calculate the centroid $x_o$ of all points except $x_{n=1}$; 3) Transformation—consisting of reflection, expansion, contraction and reduction operations, i.e. compute the new simplex from the current on by first trying to replace the worst vertex $x_h$ with a better point by using reflection, expansion or contraction with respect to the best. If this is successful in terms of maximizing the objection function, the accepted point (vector component) becomes the new vertex of the working simplex. If this fails, the simplex is shrunk toward the best vertex $x_l$.

According to Wikipedia, the Nelder-Mead method or downhill simplex method or Amoeba method is a common nonlinear optimization technique and numerical method that was proposed by John Nelder & Roger Mead (1965) and is a technique for minimizing an objective function in a many-dimensional space.

The method uses the concept of a simplex, which is a special polytope of N+1 vertices in N dimensions. Examples of simplices include a line segment on a line, a triangle on a plane, a tetrahedron in three-dimensional space and so forth.

The method approximates a local optimum of a problem with N variables when the objective function varies smoothly and is unimodal.

Following local optimization, each reference vector is tested and corrected for positive or negative cycle slips. FIG. 11 is a flow diagram showing the cycle slip detection/correction operation. The method of determining carrier cycle slips is comprised of:

1. Using dynamic programming to identify and remove cycle slips from each of the reference vector phase components;
2. Using local optimization to smooth the phase trajectory using fitness criteria;
3. Identifying remaining cycle slip sections by quantized acceleration detection; and
4. Using a local optimization method to do a final smoothing of the phase trajectory.

The first step in the cycle slip detection and correction process consists of a refinement to each estimated velocity vector component (vij) in the reference vector set $N_{pop}$. Each velocity vector component is incremented by an amount equal to $(\lambda * n_x/dt)$ where $n_x = (\pm 1, \pm 2)$. The resultant reference vector set is evaluated by the objective function. The selected $v_{ij}$ component vectors are those which maximize the correlation value used as the objective function.

The second step in this process consists of the cycle slip removal process. In this step, an assumption of cycle slip values of $n_x$ are made ($n_x=0, \pm 1, \pm 2$). For each value of $n_x$ the component velocity vector $v_{ij}$ is corrected by amount equal to: $(v_{ij}/t+n_x)$. The selected vector components are the ones which maximize the objective function. In addition, the integrated phase changes for each reference vector (or each velocity component in the reference vector) over the genetic cycle period is maintained. In this example, discrete velocity increments over individual time intervals are utilized. Another method is to utilize a functional change in velocity over multiple time intervals to isolate phase shifts.

Following cycle slip correction, the resulting reference vector set ($N_{pop\ new}$) is propagated forward in time by incrementing the carrier and code phase components of each vector by an amount equal to the velocity component of that vector times the iteration interval. These new reference state vectors become the initial population of the next iteration of the genetic tracking process.

Figure 12:
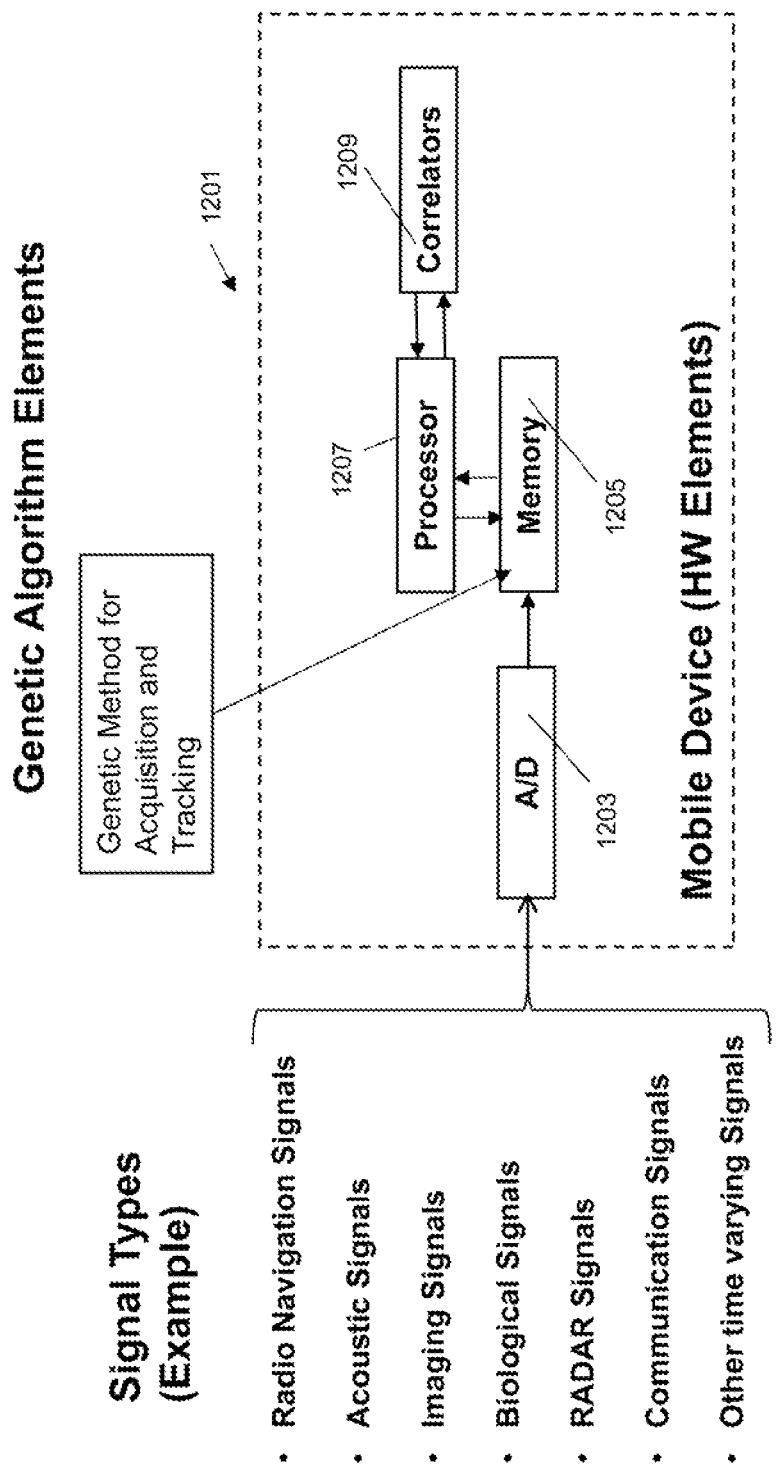
FIG. 12 is a diagram of a genetic processing algorithm mapped to hardware device functions of a mobile device according to one embodiment of the present disclosure.

FIG. 12 shows how the Genetic Processing Functions described herein are implemented in a mobile device 1201. Signal acquisition and/or signal tracking functions may be implemented by the defined genetic processing method. More particularly, the signal acquisition and/or signal tracking functions may be associated with a mobile device 1201 may be implemented by the genetic processing method as described herein. A non-exhaustive list of the types of signals to which the genetic processing functions may be applies are Radio Navigation Signals, Acoustic Signals, Imaging Signals, Biological Signals, RADAR Signals, Communication Signals, other time varying signals. Furthermore, as shown in FIG. 12, the mobile device 1201 comprises a Analog to Digital Convertor ("A/D") 1203, a memory device 1205, a processor 1207, and a correlator 1209. The correlator 1209 performs the correlation functions of processing received signals as appropriate. The processor 1207 may be located within the mobile device 1201 and is electrically coupled to or otherwise connected to the memory device 1205, or non-transitory computer readable medium, for recording data or information from the processor 1207. The processor 1207 may be configured to allow computational functions to be modified and carried out within the mobile device based on commands or instructions received from other components of the mobile device 1201. In another embodiment, the processor 1207 also may be located remotely from but in communication with the mobile device 1201.

The software stored in the memory device 1205 may include an ordered listing of executable instructions for implementing logical functions (i.e., "logic" that may be implement either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

A mobile device as referred to herein may be implemented as a handheld portable device, computer, mobile telephone, sometimes referred to as a smartphone, tablet personal computer (PC), laptop computer, or any combination thereof. Non-limiting examples of smartphones include, for example, Palm® products such as Palm® Treo® smartphones (now Hewlett Packard or HP), Blackberry® smart phones, Apple® iPhone®, Motorola Droid®, and the like. Tablet devices include the iPad® tablet computer by Apple® and more generally a class of lightweight portable computers known as Netbooks. In some embodiments, the mobile device may be comprise, or be implemented as, any type of wireless device, mobile station, or portable computing device with a self-contained power source (e.g., battery) such as a laptop computer, ultra-laptop computer, personal digital assistant (PDA) with communications capabilities, cellular telephone, combination cellular telephone/PDA, mobile unit, subscriber station, user terminal, portable computer, handheld computer, palmtop computer, wearable computer, media player, pager, messaging device, data communication device, and so forth. Further, while described with reference to a mobile device with regard to FIG. 12, the Genetic Processing Functions described herein may be implemented in any other device as appropriate for processing a particular type or form of signal.

Figure 13:
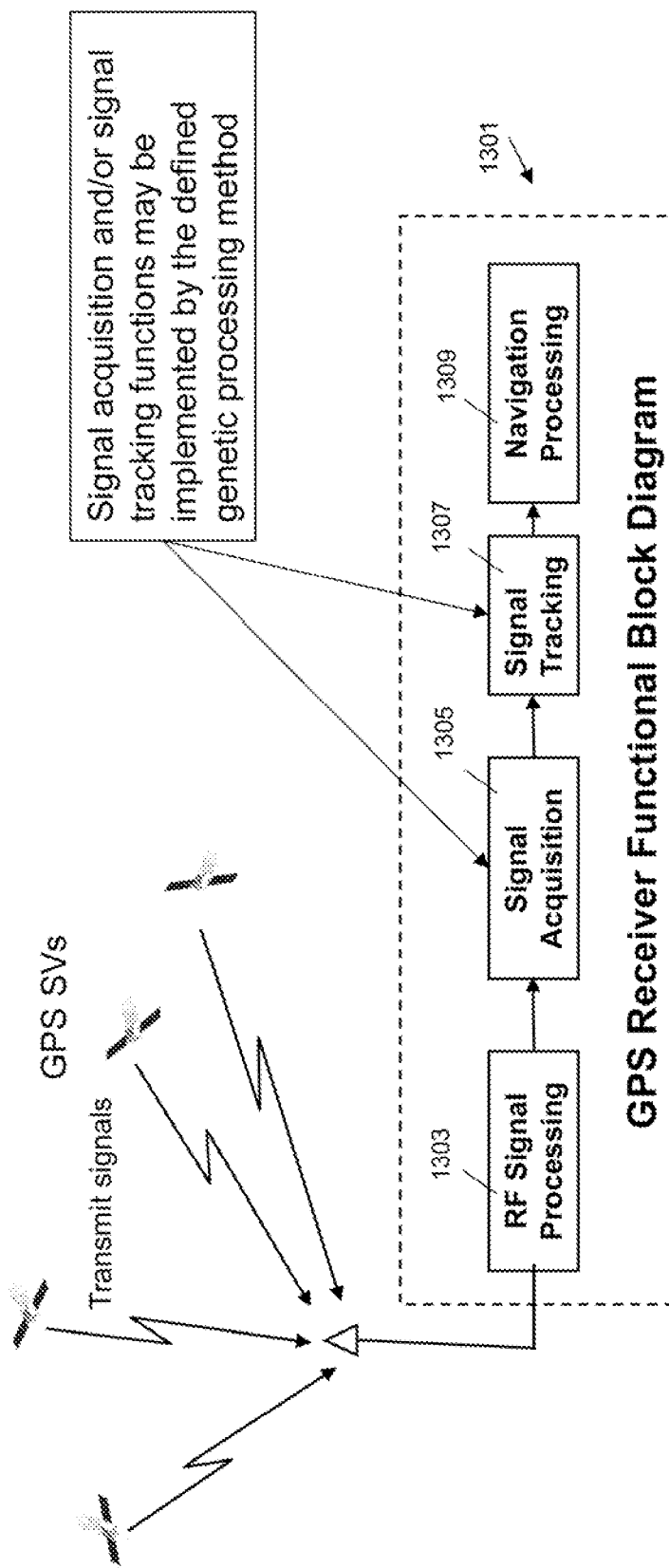
FIG. 13 is a diagram of an application of a genetic processing algorithm to GPS receiver functions according to one embodiment of the present disclosure.
Figure 14:
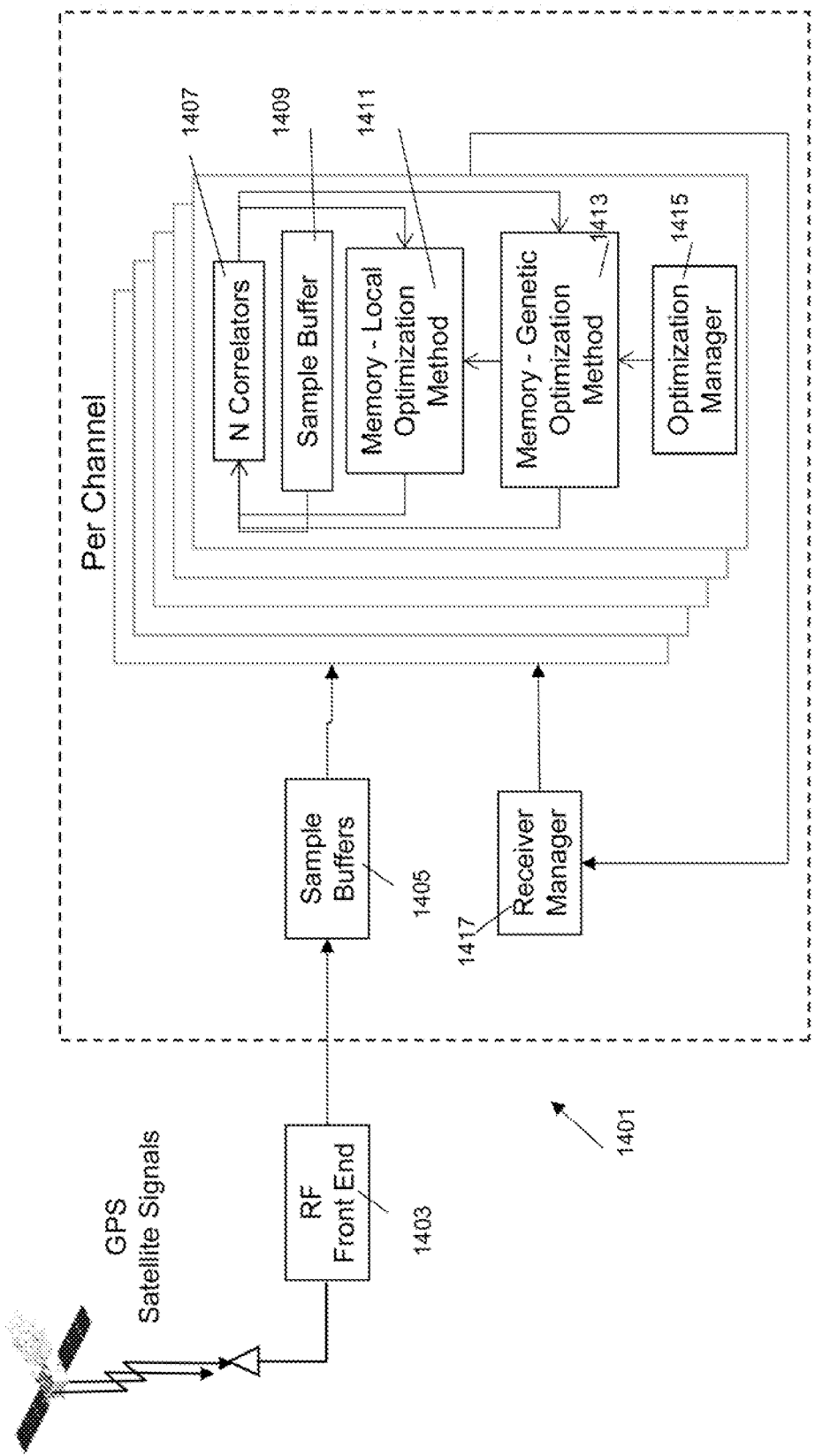
FIG. 14 is a diagram of a GPS receiver implementation using genetic processing according to one embodiment of the present disclosure.

FIG. 13 is an embodiment of an application of the Genetic Processing Functions to a GPS System. As shown in FIG. 13, the GPS receiver 1301 may comprise an RF Signal Processing component 1303, a Signal Acquisition component 1305, a Signal Tracking component 1307, and a Navigation Processing component 1309. With regard to signals received from the GSP space vehicles ("SVs") or satellites, the signal acquisition and/or signal tracking component functions may comprise the defined genetic processing method. Additionally, FIG. 14 is another embodiment of a GPS Receiver Implementation Using Genetic Processing. As shown in FIG. 14, a GPS receiver 1401 receives GPS signals from a GPS satellite via a RF Front End 1403. The receiver 1401 comprises sample buffers 1405 that provide data samples per channel to components of the receiver. Those components may comprise N-Correlators 1407, a sample buffer 1409, memory that stores a Local Optimization Method 1411, memory that stores a Global Optimization Method 1413, an Optimization Manager 1415, and a Receiver Manager 1417.

It will be appreciated that embodiments of the method and system of the present disclosure may alternatively be implemented by software programs controlling a programmable computer, or by hardware-based integrated circuit devices, including microprocessors and permanent instructions containing memories. Additionally, as would be appreciated by someone skilled in the relevant art(s) and described below with reference to FIGS. 1-14, part or all of one or more aspects of the methods and system discussed herein may be distributed as an article of manufacture that itself comprises a computer readable medium having computer readable code means embodied thereon.

The computer readable program code means is operable, in conjunction with a computer system, to carry out all or some of the steps to perform the methods or create the system discussed herein. The computer readable medium may be a recordable medium (e.g., hard drives, compact disks, EPROMs, or memory cards). Any tangible medium known or developed that can store information suitable for use with a computer system may be used. The computer-readable code means is any mechanism for allowing a computer to read instructions and data, such as magnetic variations on a magnetic media or optical characteristic variations on the surface of a compact disk. The medium can be distributed on multiple physical devices (or over multiple networks). For example, one device could be a physical memory media associated with a terminal and another device could be a physical memory media associated with a processing center.

The computer devices, systems, and servers described herein each contain a memory that will configure associated processors to implement the methods, steps, and functions disclosed herein. Such methods, steps, and functions can be carried out, e.g., by processing capability on mobile device, POS terminal, payment processor, acquirer, issuer, or by any combination of the foregoing. The memories could be distributed or local and the processors could be distributed or singular. The memories could be implemented as an electrical, magnetic or optical memory, or any combination of these or other types of storage devices. Moreover, the terms "memory", "memory storage", "memory device", or similar terms should be construed broadly enough to encompass any information able to be read from or written to an address in the addressable space accessed by an associated processor.

Aspects of the present disclosure discussed with regards to and shown in FIGS. 1-14, or any part(s) or function(s) thereof as appropriate, may be implemented using hardware, software modules, firmware, tangible computer readable media having instructions stored thereon, or a combination thereof and may be implemented in one or more computer systems or other processing systems.

The various illustrative functional elements, logical blocks, modules, circuits, and processors described in connection with the embodiments disclosed herein may be implemented or performed with an appropriate processor device, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein as appropriate. As described herein a processor may be a microprocessor, but in the alternative, the processor may be any conventional processor, controller, microcontroller, or state machine designed to perform the appropriate function. A processor may be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format.

The functions of the various functional elements, logical blocks, modules, and circuits elements described in connection with the embodiments disclosed herein may be performed through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the terms "processor" or "module" should not be construed to refer exclusively to hardware capable of executing software, and may implicitly include, without limitation, DSP hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The various functional elements, logical blocks, modules, and circuits elements described in connection with the embodiments disclosed herein may comprise a processing unit for executing software program instructions to provide computing and processing operations for the systems and methods described herein. A processing unit may be responsible for performing various voice and data communications operations between the mobile device and other components of an appropriate system. Although the processing unit may include a single processor architecture, it may be appreciated that any suitable processor architecture and/or any suitable number of processors in accordance with the described embodiments. In one embodiment, the processing unit may be implemented using a single integrated processor.

The functions of the various functional elements, logical blocks, modules, and circuits elements described in connection with the embodiments disclosed herein may also be implemented in the general context of computer executable instructions, such as software, control modules, logic, and/or logic modules executed by the processing unit. Generally, software, control modules, logic, and/or logic modules include any software element arranged to perform particular operations. Software, control modules, logic, and/or logic modules can include routines, programs, objects, components, data structures and the like that perform particular tasks or implement particular abstract data types. An implementation of the software, control modules, logic, and/or logic modules and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, control modules, logic, and/or logic modules may be located in both local and remote computer storage media including memory storage devices.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

It is worthy to note that any reference to "one embodiment" or "an embodiment" means that a particular feature, structure, or characteristic described in connection with the embodiment is included in at least one embodiment. The appearances of the phrase "in one embodiment" or "in one aspect" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are included within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present disclosure, therefore, is not intended to be limited to the example aspects and aspects shown and described herein. Rather, the scope of present disclosure is embodied by the appended claims.

The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or example language (e.g., "such as", "in the case", "by way of example") provided herein is intended merely to better illuminate the present disclosure and does not pose a limitation on the scope of the present disclosure otherwise claimed. No language in the specification should be construed as indicating any non-claimed element essential to the practice of the present disclosure. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the disclosed embodiments.

It is to be understood that the disclosed embodiments of the present disclosure are by no means limited to the particular apparatus and steps herein disclosed and/or shown in the drawings, but also comprise any modifications or equivalents within the scope of the claims.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the disclosed embodiments and appended claims.

Various aspects of the subject matter described herein are set out in the following numbered clauses:

1. A coherent process for the acquiring and tracking of time varying signals by simultaneously using both global and local optimizing methods to process received data samples.

A. One method for implementing this process is by using a genetic algorithm for the global optimization portion and an Amoeba algorithm for the local optimization processes.

B. Other optimization embodiments include simulated annealing algorithm for global and Nelder-Mead methods for the local optimization; still others include Simplex and the Complex algorithm.

C. Application of embodiments of this disclosure covers CDMA, FDMA, TDMA, amongst other multiple access techniques.

D. Uses and markets for embodiments of this disclosure include: Satellite radio navigation, communication systems, RADAR, acoustics, optical transmission, amongst others.

2. A method in accordance with claim 1 wherein coherent tracking is comprised of Genetic algorithms for both code signal phase and carrier signal phase.

3. A process that uses a unique formulation for acquiring a time varying signals that is composed of the steps outlined in this provisional application.

4. A process that uses a unique formulation for tracking of a time varying signal that is composed of the steps outlined in this provisional application.

5. A method in accordance with claim 1 wherein the Genetic algorithms (state vector population, reproduction operation and mutation operation) utilize an expanded non-binary set of independent components such as: velocity, acceleration, code offset, carrier offset, data bits and data bit time offset; and are followed with a local optimization algorithm for state vector propagation.

6. A method wherein multi-frequency, multi-segment optimized code sections are used to improve the length of coherent integration time.
A. Global optimization methods to create an initial set of optimal code segments
B. Local optimization methods to optimize a maximal magnitude phase trajectory for each of the multiple segments of time each with independent carrier/code frequencies and rates to resolve clock and dynamic instabilities.

7. A method in accordance with claim 6 wherein a global optimization method, such as a genetic algorithm, is used to optimize code segments and local optimization methods are used to create a maximal magnitude phase trajectory using multi-segments of time.

8. A method in accordance with claim 6 wherein each time segment has independent carrier/code frequencies and rates to resolve clock and dynamic instabilities.

9. A method to resolve carrier cycle slips, the method comprising:
A. Using dynamic programming to identify and remove cycle slips;
B. Using a local optimization to smooth the phase trajectory;
C. Identifying remaining cycle slip sections by quantized acceleration; and
D. Applying a local optimization method to do a final smoothing of the phase trajectory.

10. A method of combining global optimization and local optimization, the method comprising:
A. Determining a global optimization solution with a genetic algorithm utilizing a general population composed of sets of 3 multi-segmented parent vector states; and
B. Looking for discontinuities and performing local optimization on those wining and sorted selections.
C. Using a local optimization algorithm for the selection of a third parent in the next generation multi-segmented vector set.

11. The disclosure substantially as disclosed and described.

12. A method wherein the use of different individual genomes, represented as multi-dimensional vectors, may be thought of as emulating the effect of a multi-dimensional matched filter in the signal reference selection process.

13. A method of utilizing the genetic tracking algorithm to process biological signals such as heart rate data. In this case raw accelerometer and heart rate sensor data are preprocessed in such a manner as to suppress spurious signals. The resultant signal is correlated with hypothesized rate reference signals to generate the objective function. The objective function is used as a metric for rate evaluation. The genetic processes previously described (vector component population reproduction including mutations) are iterated to track heart rate variations.

The invention claimed is:

1. A method comprising:
coherently tracking time varying signals by a method comprising:
receiving a time varying signal;
sampling the time varying signal to generate data samples; and
applying an evolutionary algorithm to the data samples, the evolutionary algorithm comprising:
generating a population of an expanded set of state vectors representing a reference signal, each of the state vectors comprising one or more components;
iteratively processing the state vectors by a method to create a maximal magnitude phase trajectory, the method comprising:
correlating the data samples of the time varying signal with each of the state vectors;
ranking a magnitude of a correlation between the data samples and each of the state vectors; and
applying a non-binary reproduction algorithm to the population of state vectors as ranked to generate a candidate population of the state vectors; and
optimizing the state vectors and phase trajectories by a local optimization method, the local optimization method comprising:
smoothing the phase trajectories, refining the candidate population of the state vectors, and formulating new state vectors selections to add to the population of state vectors;
creating a maximal magnitude phase trajectory for each of a plurality of multiple segments represented by the state vectors;
removing and repairing cycle slip sections from the state vectors; and
performing a second smoothing of the phase trajectory of the state vectors by the local optimization algorithm.

2. The method of claim 1, wherein the evolutionary algorithm comprises at least one of a genetic algorithm or a simulated annealing algorithm.

3. The method of claim 1, wherein the one or more components comprise phase, velocity, acceleration, code offset, carrier offset, data bits, and data bit time offset.

4. The method of claim 1, wherein the expanded set of state vectors include use of multi-velocity, multi-frequency, or multi-segmented optimized code and carrier sections to improve the length of coherent integration time.

5. The method of claim 4, comprising global optimization methods to create an initial set of optimal velocity and code segments.

6. The method of claim 4, comprising local optimization methods to optimize a maximal magnitude phase trajectory for each of the multiple segments of time each with independent carrier/code frequencies and rates to resolve clock and dynamic instabilities.

7. The method of claim 4, comprising using a global optimization method to optimize velocity and code segments, and using local optimization methods to create a maximal magnitude phase trajectory using multi-segments of time.

8. The method of claim 1, wherein the state vectors are iteratively processed until population differences between the state vectors are not improved.

9. The method of claim 1, wherein the state vectors are iteratively processed a finite number of generations.

10. The method of claim 1, wherein the non-binary reproduction algorithm comprises:
   selecting a top portion of the state vectors as ranked;
   choosing three parents from the selected state vectors; and
   generating a child from the three parents.

11. The method of claim 10, wherein the child is generated from the parent via three-point vector component interpolations.

12. The method of claim 1, wherein the state vectors number N, the reproduction algorithm comprising:
   randomly selecting a plurality of state vectors from a top portion of the state vectors as ranked;
   generating N/2 state vectors from the randomly selected plurality of state vectors of the top portion via interpolation of the components;
   randomly selecting a plurality of state vectors from a bottom portion by rank of the state vector population; and
   generating N/2 state vectors from the randomly selected state vectors of the bottom portion via a mutation algorithm.

13. The method of claim 12, wherein the top portion is 25%.

14. The method of claim 12, wherein the bottom portion is 50%.

15. The method of claim 1, wherein removing and repairing cycle slip sections from the state vectors comprises:
   using dynamic programming to identify and remove cycle slips;
   using a local optimization to smooth the phase trajectory;
   identifying remaining cycle slip sections by quantized acceleration; and
   applying a local optimization method to do a second smoothing of the phase trajectory.

* * * * *